US008323449B2

(12) United States Patent
De Almeida Lima et al.

(10) Patent No.: US 8,323,449 B2
(45) Date of Patent: Dec. 4, 2012

(54) COMPOSITIONS AND METHODS FOR RESIN-BASED WOOD GLUES

(75) Inventors: Paolo De Almeida Lima, Sao Paolo (BR); Ronaldo Dos Santos Flor, Sao Paulo (BR)

(73) Assignee: PQ Silicas UK Limited, Warrington Cheshire (GB)

( * ) Notice: Subject to any disclaimer, the term of this patent is extended or adjusted under 35 U.S.C. 154(b) by 691 days.

(21) Appl. No.: 12/441,633

(22) PCT Filed: Sep. 14, 2007

(86) PCT No.: PCT/GB2007/003463
§ 371 (c)(1),
(2), (4) Date: Aug. 18, 2009

(87) PCT Pub. No.: WO2008/035042
PCT Pub. Date: Mar. 27, 2008

(65) Prior Publication Data
US 2009/0314427 A1    Dec. 24, 2009

(30) Foreign Application Priority Data

Sep. 18, 2006  (BR) ...................................... 0604075
Nov. 3, 2006   (GB) .................................. 0621950.5

(51) Int. Cl.
*B32B 37/12*    (2006.01)
*C08K 5/1545*   (2006.01)
(52) U.S. Cl. ............................ 156/328; 524/56; 524/13
(58) Field of Classification Search .................. 156/328; 524/13, 56
See application file for complete search history.

(56) References Cited

U.S. PATENT DOCUMENTS

| 3,658,622 | A | * | 4/1972 | Horowitz et al. .......... 156/331.9 |
| 4,329,177 | A | | 5/1982 | George |
| 4,391,642 | A | | 7/1983 | Stevenson et al. |
| 4,437,893 | A | | 3/1984 | Krinski et al. |
| 5,776,242 | A | | 7/1998 | Gill et al. |

FOREIGN PATENT DOCUMENTS

| DE | 3241495 A1 | 7/1984 |
| JP | 62146972 | 6/1987 |
| JP | 2002020698 | 1/2002 |

OTHER PUBLICATIONS

International Search Report dated Jan. 24, 2008.

* cited by examiner

*Primary Examiner* — Philip Tucker
*Assistant Examiner* — Daniel Lee
(74) *Attorney, Agent, or Firm* — Buchanan Ingersoll & Rooney PC

(57) ABSTRACT

A method for extending resin-based wood glues, particularly condensation polymer resin-based glues, comprises the steps of (i) providing an aqueous extender composition comprising 20% to 50% by weight of alkali metal silicate and 1% to 25% by weight of polyhydric alcohol, preferably a sugar such as sucrose, (ii) providing a solution comprising a resin and (iii) blending the aqueous extender and the solution together to form a glue. The extended glues are suitable for preparing water resistant processed wooden panels such as plywood or chipboard with reduced need for resin. The extended glues do not set excessively rapidly, allowing time for the processing of the wood composites.

15 Claims, No Drawings

COMPOSITIONS AND METHODS FOR RESIN-BASED WOOD GLUES

The present invention relates to an extender for use in glues for adhering natural materials such as wood, paper or fibres. It also relates to glues, manufacturing processes for panels of processed natural materials and the panels themselves.

Paper, wood and natural fibres are examples of natural materials (i.e. materials obtained from renewable resources) used in the production of articles for the construction industry, the furniture industry and in industry in general.

Examples of products made with natural materials, and widely used in construction and in the furniture industry are wood processed panels, such as plywood, chipboard, medium density fibreboard, and also wooden doors.

Various types of wood may be used to produce processed wooden panels, such as pines, eucalyptus and tropical wood.

The manufacturing process for processed wooden panels consists of several stages. In the case of plywood panels, the first stage is to cure the wood then slice it into sheets with a thickness of about 2 mm. The sheets have to be dried and classified before use. One face of a dried sheet has glue applied to it and a second sheet is then placed adjacent to the first sheet and the glue layer. The process is repeated, adding further sheets until the final thickness of panel is reached. The panel is then put under a press for compression under ambient (room temperature) conditions. This stage, also known as cold pressing, can take from one hour to one or more days before the panels are subjected to hot pressing in order to set the glue. A long time period between cold pressing and hot pressing can lead to weaknesses in the final plywood bond quality. In particular, the glue may commence setting, or drying out, before hot pressing, leading to bond strength problems. Usually, the interval between cold pressing and hot pressing is from 30 minutes to 15 hours. The panel is put into a heated press for several minutes in order to set the glue, the time required depending upon the thickness of the panel, as well as upon the amount and the kind of glue used and the porosity of the wood itself. The panels are then monitored for quality and cut to the required size.

Depending on the type of glue used, the final panel can be waterproof or water resistant. Such panels are of use in civil construction and for structural purposes.

In the case of chipboard panels, the tree wood is first cut into small pieces or chips. The chips are dried and classified. When ready, glue is applied over them. Then a cake is made, preferably with finer chips in the inner and outer regions. The cake is then pressed in a hot press for some minutes. The pressure, time and temperature depend on the kind and amount of glue applied, and the kind of wood used.

Related methods using glue, well known in the art, are used for producing wood-based products such as oriented strand board (OSB), waferboard and MDF (medium density fibreboard).

Organic resins are largely used as part of the glue in the wood processing industry, to make panels. The more common resins used are phenolic resin (phenol formaldehyde resin), urea formaldehyde resin, PVA (polyvinyl alcohol) and melamine formaldehyde resin, and the term "resin" as used in this description includes these organic compounds. Throughout this description, the terms phenolic resin, phenol formaldehyde and phenol formaldehyde resin are used to mean phenol formaldehyde resin.

Among the known resins used in glues employed in the manufacture of processed wood panels, phenolic resin or phenol formaldehyde resin, a compound made by a chemical reaction between phenol and formaldehyde, is the most commonly used. Its cost is generally higher than urea-formaldehyde, but the panels made with it are normally more resistant against water. In order to achieve such performance, variables such as the amount of glue applied, assembling time, the solvent level in the glue, the pressure, temperature and time used, must be controlled.

Compared to panels made with phenol formaldehyde resin, panels made with urea-formaldehyde resin are not be considered as waterproof or water-resistant, and because of this, are generally used for interior purposes, such as for furniture or to make internal doors (for furniture, the resin used is often is urea-formaldehyde and for internal doors, PVA is often chosen).

Another condensation polymer resin commonly used in wood glues is melamine formaldehyde resin, sometimes referred to in abbreviated form as "melamine".

The prior art patent U.S. Pat. No. 5,776,242 discloses silicate-dextrin-clay adhesive compositions for use in making paper products. U.S. Pat. No. 4,437,893 discloses a silicate-containing adhesive suitable for the production of laminated paper products comprising an aqueous solution of alkali metal silicate together with soy polysaccharides in an amount effective to thicken the silicate solution. Published Japanese patent application JP 62-146972 discloses an adhesive comprising alkaline silicate and a high molecular weight polymer based on maltotriose, a trimer of glucose.

The resins used in glue for the production of processed wooden panels make a significant contribution to the overall cost of manufacture. Hence there is a need for new products to replace resins, at least partially, with the new replacement products ideally having greater availability and a lower cost, yet producing the same results in the final panels. However, simply lowering the level of resin in the adhesive can lead to poor adhesive characteristics such as loss of waterproofing, unreliable setting behaviour or reduced strength. Hence there is a need for adhesive compositions which contain reduced amounts of resins, but which have good adhesive, waterproofing or curing characteristics. There is also a need for a simple method for preparing such adhesives by simple blending from existing adhesives. Current diluents or extenders, when blended with existing resin-based adhesives, can lead to a loss in the desirable characteristics of the adhesive, such as strength or setting rate. There is a need for methods for extending adhesives which do not lead to substantial degradation in such properties.

The present invention provides, in a first aspect, a method for the preparation of a wood glue comprising from 4% to 60% by weight of a resin, the method comprising the steps of (i) providing an aqueous extender composition comprising from 20% to 50% by weight of alkali metal silicate and from 1% to 25% by weight of polyhydric alcohol, (ii) providing a solution comprising a resin and (iii) blending the aqueous extender composition of step (i) and the solution comprising a resin of step (ii) together to form the wood glue.

Suitably, the aqueous extender of step (i) and the solution of step (ii) are blended together homogeneously to form the wood glue. In other words, the resulting wood glue is a homogeneous solution or dispersion. Where particulate matter, such as wheat flour, is included in the wood glue, it is suitably homogeneously distributed. Preferably, the aqueous extender of step (i) and the solution of step (ii) are completely miscible such that on mixing they form a single liquid phase within the ranges specified for the method of the invention.

The solution of step (ii), which comprises a resin, is suitably itself a resin-based glue, such as a commercial glue. Typically, the solution of step (ii) is free of silicate and/or sugar. Typically the solution of step (ii) will be an aqueous solution, meaning that it will comprise 10% or more, preferably 20% or more, by weight, of water.

The resin in the solution of step (ii) is preferably a condensation polymer resin, more preferably selected from the group consisting of phenol formaldehyde resin, urea formaldehyde resin, melamine formaldehyde resin and mixtures thereof. Even more preferably, the resin is a phenol formaldehyde resin. A typical phenol formaldehyde resin solution suitable for use in the invention consists of about 67% formaldehyde solution(37% by weight formaldehyde in the solution), 21% phenol (as 100% phenol) and 12% NaOH solution (50% by weight NaOH in the solution). These resins are typically supplied as commercially available solutions with the resin dissolved and/or dispersed in a solvent or diluent, often water or an aqueous solvent. A typical commercial resin solution suitable as the resin-comprising solution of step (ii), and available in Brazil, is supplied by BAQ as BAQPHEN 4018 (previously 4051-3) which is an aqueous solution containing from 48 to 51% by weight of alkaline phenolic resin. Another commercial resin-containing solution suitable as the solution of step (ii) is FENO LM 500 B, supplied in Brazil by Georgia Pacific Resinas Internacionais Ltda. When an alkaline alkaline phenolic resin is used, it is typically of the type known as "RESOL". Typically, all of the resin in the final wood glue of the invention, prepared by the method of the first aspect of the invention, is provided by the resin-containing solution of step (ii), although the inclusion of further resin other than in steps (i) and (ii) is not necessarily excluded by the method of the invention.

Hence, the composition prepared by the method of the first aspect of the invention is a wood glue comprising the aqueous extender composition of step (i) and the resin-comprising solution of step (ii). The resulting wood glue of the invention comprises from 4 to 60% by weight of resin. Typically, the aqueous extender composition of step (i) is free from resin.

Throughout this description, where preferred or more preferred ranges of materials are given, the lower end of one range may be combined with the upper end of another range to form other, preferred ranges for that material. By extender is meant a composition which can be blended with a conventional resin-based glue, such as a phenol formaldehyde resin-based glue, to form an extended glue having a lower content of resin than the original glue.

The wood glue prepared by the method of the first aspect of the invention suitably comprises from 4% to 60%, preferably from 5% to 49%, more preferably from 6% to 40%, most preferably from 7% to 35% by weight of resin. It is particularly preferred for the glues prepared by the method of the invention to comprise 11% or more of resin in combination with any of the upper limits detailed above. For the sake of clarity, weight percentages of resin refer to the organic resin as such, expressed as 100% organic polymeric resin, and not including any diluents or solvents Suitably, the extender comprises from 20% to 50% by weight of alkali metal silicate, preferably from 25% to 45%, more preferably from 32% to 44%. Suitably, the extender comprises from 1% to 25% by weight of polyhydric alcohol, preferably from 1% to 24% more preferably from 1% to 16% by weight. Suitably, the extender comprises 1% or more, preferably 3% or more, more preferably 5% or more of polyhydric alcohol. The remainder of the extender is preferably water, or consists essentially of water. The extender suitably comprises 10% or more, preferably 20% or more, by weight, of water.

Surprisingly, the extender can be incorporated into the glue at high levels without significant deterioration in the desired glue characteristics, and without destabilisation of the glue or precipitation of ingredients.

The extender of the invention is easily transported and easily mixed with the glue base which comprises resin, such as condensation polymer resin, to form an effective glue for gluing wood or for forming wooden composites such as sheets of plywood or fibreboard.

Alternatively, the components of the extender can be separately added to a glue base in order to form the extended glue having a reduced need for resin.

If silicate alone, such as in the form of aqueous solution, is used as an extender, the resulting glue, although having many desirable characteristics maintained after extension, tends to solidify more rapidly than the unextended glue, and this can lead to problems in the production of panels. Compression of the panels, for instance for forming plywood, must take place more rapidly after initial application of the extended glue when silicates alone are employed as an extender, otherwise the extended glue may have set prior to compression of the panels. This is particularly the case for soft woods, such as pine woods, where the extended glue may set shortly after cold pressing, prior to hot pressing, risking weakness in the final product.

The incorporation of polyhydric alcohol along with silicate in the extender, and ultimately in the glue, additionally solves the problem of excessively fast drying caused when silicate solution alone is added as an extender to resin-based glues. When silicate solutions are used as an extender, it has been found that rapid drying of the glue may take place, leading to skin formation on exposed glue surfaces. It has also been found that alkaline silicates may react with atmospheric carbon dioxide, leading to the formation of a skin or pre-setting of the glue prior to hot pressing. Surprisingly, the use of polyhidric alcohols, in combination with silicates in an extender, tackles these problems, allowing silicate to be used as a glue ingredient without significant loss in bond quality.

Suitably, the extender of step (i) of the method of the invention is blended with the solution of step (ii) of the method of the invention, such that the final, extended glue comprises from 0.5% to 50%, preferably from 1% to 40%, more preferably from 5% to 40%, even more preferably from 10% to 40% by weight of the aqueous extender according to the first aspect of the invention.

It is clear that both the resin and the extender cannot both be present at the upper limits of their preferred ranges in the same glue, as this would lead to a total percentage greater than 100. The ranges are limited in practice by the levels of other component present, but represent the possible values falling within the invention. For instance a glue, prepared according to the first aspect, with 60% resin could only have up to 40% extender as a maximum, while if 50% extender was present, only 50% resin would be possible. These same principles apply to the other formulations detailed in this specification.

Hence, a second aspect of the invention is a glue comprising from 4% to 60%, preferably from 5% to 49% by weight of resin and from 0.5% to 50%, preferably from 1% to 40%, more preferably from 5% to 40%, even more preferably from 10% to 40% by weight of an aqueous extender according to the first aspect of the invention. The remainder of the glue suitably is, or consists essentially of, water. In addition to the aqueous extender and the resin-comprising solution forming the glues of the invention, water may also be added at any suitable level, typically up to 25% by weight of the final glue. Water-insoluble, solid particulate fillers, such as wheat flour may also be included as up to 25% by weight of the final glue, preferably up to 15%. By water-insoluble is meant having a solubility in water at 25° C. of 0.5% by weight or less. Suitable fillers have a weight mean particle size as measured by sieving of 100 micrometers or less, preferably 40 micrometers or less, more preferably 10 micrometers or less. Conveniently, when particulate fillers such as wheat flour are used, the level of these may be varied along with water level in the glue in order to tailor a glue to a desired viscosity. For instance, if the viscosity of an extended glue according to the invention is too low when water is added, part of the water, such as up to 1% of water, may be replaced by wheat flour in order to increase the glue viscosity. Suitably, the viscosity of the glue is from 0.5 to 3.0, preferably from 0.7 to 2.0, more preferably from 1.0 to 1.5 Pa.s at 25° C. (at a shear rate of 21 $sec^{-1}$).

Soluble fillers such as phosphates, urea or salts may also be added at levels where they do not impair the performance of the resulting glue, such as up to 5%, or up to 3% by weight of the wood glue.

Throughout this description, the resin is preferably a condensation polymer resin, more preferably selected from the group consisting of phenol formaldehyde resin, urea formaldehyde resin, melamine formaldehyde resin or mixtures thereof. Even more preferably, the resin is a phenol-formaldehyde resin.

Rather than forming this extended glue by adding an extender to a conventional glue, the glue can be provided by preparing a glue containing, in addition to resin, and its conventional ingredients, alkali metal silicate and polyhydric alcohol.

A third aspect of the invention is a glue comprising from 4% to 60%, preferably from 5% to 49%, by weight of resin, from 0.45% to 40.5%, i.e. about 0.5% to 40%, preferably from 0.5% to 18%, more preferably from 0.5% to 12% by weight of alkali metal silicate and from 0.76% to 15.2%, i.e. about 0.8% to 15%, preferably from 4% to 8% of polyhydric alcohol.

When the glue is made using the extender as detailed in the first aspect of the invention, it is a glue according to the third aspect comprising from 4% to 60%, preferably from 5% to 49% by weight of resin and from 0.1% to 25%, preferably from 0.2% to 20%, more preferably from 1% to 20%, even more preferably from 2% to 20% by weight of alkali metal silicate and from 0.05% to 12.5%, preferably from 0.1% to 10%, more preferably from 0.5% to 10%, even more preferably from 1% to 10% by weight of polyhydric alcohol. These values are calculated from the preferred ranges of the alkali metal silicate and polyhydric alcohol in the extender combined with the preferred ranges for the level of extender in the final glue from the first aspect of the invention.

Excessive amounts of polyhydric alcohol in the glue can lead to a reduction in the bond strength of the final glue. If levels are too low, then the problems of rapid drying, skin formation and setting, associated with silicates, will not be adequately solved.

The remainder of the glue preferably is, or consists essentially of, water. Suitably, the glue comprises 10% or more, preferably 20% or more, by weight, of water. However, solid, water-insoluble particulate fillers, as detailed for the second aspect of the invention, particularly wheat flour, may be included as up to 25% by weight of the glue, more preferably up to 15% by weight.

The glues of the second and third aspects of the invention suitably comprise from 4% to 60%, preferably from 5% to 49%, more preferably from 6% to 40%, most preferably from 7% to 35% by weight of resin. It is particularly preferred for the glues of the second aspect of the invention to comprise 11% or more of resin in combination with any of the upper limits detailed above.

A fourth aspect of the invention is a method for preparing wooden composites comprising the steps of (i) providing a glue according to the second or third aspects of the invention, (ii) providing particles or sheets of wood and (iii) gluing together the particles or sheets of wood with the glue.

A fifth aspect of the invention is a method for preparing wooden composites comprising the steps of (i) preparing an extended resin-based glue by the method of the first aspect of the invention, (ii) providing particles or sheets of wood and (iii) gluing together the particles or sheets of wood with the extended resin-based glue.

The wooden composites prepared by the fourth or fifth aspects of the invention are suitably plywood, oriented strand board (OSB), waferboard, chipboard or fibreboard (such as MDF—medium density fibreboard).

Further aspects of the invention include the use of an extender as described in the first aspect of the invention in the preparation of a glue for wood.

The preferred features of the invention, as detailed below, apply to all aspects of the invention.

For the alkali metal silicate used in the invention, the molar ratio of alkali metal oxide to $SiO_2$ expressed as $SiO_2/M_2O$, where M represents the alkali metal, is suitably from 0.9 to 3.7, preferably 1 to 3.5, more preferably 1.5 to 3 even more preferably 1.8 to 2.6. A most preferred molar ratio is from 2.1 to 2.75. High molar ratios for the silicate can lead to lack of compatibility between the silicate and the resin-containing solution, such that phase separation or gelation may occur. Lower molar ratios, corresponding to more highly alkaline silicates, can lead to disruption of the glue setting behaviour because of the effects of alkali on resin polymerization and cross-linking.

The alkali metal silicate is suitably sodium silicate, potassium silicate or a mixture thereof. Preferably, the alkali metal silicate is, or consists essentially of, sodium silicate.

By polyhydric alcohol, in this specification, is meant straight, branched or cyclic saturated or unsaturated organic molecules with 2 or more carbon atoms and 2 or more OH substituent groups. Preferred polyhydric alcohols are sugars, including materials such as glucose, fructose, maltose, dextrose and sucrose. Monosaccharides, disaccharides, oligosaccharides or polysaccharides are also suitable. Preferably, the polyhydric alcohol has a solubility of at least 30% by weight in water, more preferably at least 50% by weight. Preferably, the polyhydric alcohol solution is miscible with silicate solution without precipitation of silicate or polyhydric alcohol. Conventional sugars are particularly preferred as polyhydric alcohol, especially sucrose (sometimes known as saccharose), typically sourced from cane sugar, because of its ready availability and its compatibility with condensation polymer resins. Mixtures of polyhydric alcohols may also be used.

Other suitable polyhydric alcohols are straight chain polyols with 2 to 6 carbon atoms such as ethylene glycol, propylene glycol, glycerol, erythritol and sorbitol. Polymers of such polyols are also suitable, such as polyethylene glycol, polypropylene glycol, copolymers of ethylene and propylene glycol and polyglycerol.

Preferably the polyhydric alcohol has 3 or more OH groups per molecule, more preferably 4 or more.

Preferred polyhydric alcohols for compositions of the invention are sugars, polysaccharides and polyols. Preferably, when the polyhydric alcohol is a straight chain polyol, the polyol has 3 to 6 carbon atoms per molecule, such as glycerol or sorbitol.

Particularly preferred polyhydric alcohols are disaccharides such as sucrose. Cane sugar is a suitable commercial source of disaccharide. Preferably, the polyhydric alcohol is, or consists essentially of, sugar, preferably sucrose.

Condensation polymer resins, in this specification, include both acid and base catalysed resins. Base catalysed resins are preferred for improved compatibility with the silicate used in the invention. For phenol formaldehyde resins, this term also includes resins where the phenol has one or more substituent groups.

When the glue prepared according to the invention comprises 15% or more of phenol formaldehyde resin, the resulting finished wooden composites show excellent water resistance in combination with the glue having high strength. For instance, when the glue of the invention has from 0.45 to 31.5%, i.e. about 0.5 to 31.5% by weight of silicate and from 49% to 15% by weight of phenol formaldehyde resin with 0.76 to 15.2%, i.e. about 0.8 to 15% by weight of polyhydric alcohol, the resulting finished wooden composites show excellent water resistance in combination with the glue having high strength.

When the glue prepared according to the invention comprises less than 15% of phenol formaldehyde resin, the resulting finished wooden composites are not water proof, but the mixture is a suitable alternative to urea formaldehyde resins for making plywood and chipboard panels for the furniture industry.

For instance, when the glue of the invention has from 31.95% to 40.05%, i.e. about 32% to 40% by weight of silicate and 14.5% to 5% by weight of phenol formaldehyde with 0.76 to 15.2%, i.e. about 0.8 to 15% by weight of polyhydric alcohol, the resulting finished wooden composites are not water proof, but the mixture is a suitable alternative to urea formaldehyde resins for making plywood and chipboard panels for the furniture industry.

The processes used for production of processed wood panels using the glue or extended glue of the invention are substantially similar to, or the same as, the processes used for conventional resin-based glues.

The term "consists essentially" when applied to a compound in this specification, means that at least 95% by weight of that compound, in a composition, is the material of which it is said to consist essentially.

In this specification, by aqueous composition is meant a composition comprising at least 10% by weight of water, preferably at least 20% by weight of water.

Unless otherwise stated, all percentages refer to percent by weight of compositions.

The invention will now be further described by reference to the following non-limiting examples:

EXAMPLES

Example 1

Extender Composition

An extender composition was prepared by blending:
i) 80% by weight of a sodium silicate solution in water with 45% solids content and a $SiO_2:Na_2O$: ratio of 2.22:1.
ii) 20% by weight of cane sugar syrup with a sugar content of 76%.

The cane sugar syrup was an invert sugar Gludex® 201 supplied by Dulcini® of Brazil.

The resulting composition was a homogeneous clear liquid at 25° C., suitable for transport and use as an extender for resin based glues.

Example 2

Glue

A glue was formed by blending:
i) 21.4% phenolic resin solution (50% by weight phenol formaldehyde, 50% by weight water) supplied by BAQ of Brazil as Baqphen 4051-3.
ii) 50% by weight of the Extender composition of example 1
iii) 14.3% by weight water
iv) 14.3% by weight wheat flour.

The resulting composition was as follows

| Phenol formaldehyde | 10.7% |
| Sodium Silicate | 18.0% |
| Sugar | 7.6% |
| Wheat flour | 14.3% |
| Water + minors | to 100% |

(minors include other materials present in the commercial phenolic resin solution)

The glue could be left for several hours at 25° C. without setting. A comparable glue without sugar present (replaced by water) set within 90 minutes.

Example 3

Glue

A glue was formed by blending:
i) 61.4% phenolic resin solution (50% by weight phenol formaldehyde resin, 50% by weight water as detailed above)
ii) 10% by weight of the Extender composition of example 1
iii) 14.3% by weight water
iv) 14.3% by weight wheat flour.

The resulting composition was as follows

| Phenolic resin | 30.7% |
| Sodium Silicate | 3.6% |
| Sugar | 1.5% |
| Wheat flour | 14.3% |
| Water + minors | to 100% |

The glue could be left for several hours at 25° C. without setting. A comparable glue without sugar present (replaced by water) set within 90 minutes.

Example 4

Extender Composition

An extender composition was prepared by blending:
i) 90% by weight of a sodium silicate solution in water with 45% solids content and a $SiO_2:Na_2O$: ratio of 2.15:1.
ii) 10% by weight of cane sugar syrup with a sugar content of 76%.

The cane sugar syrup was an invert sugar Gludex® 201 supplied by Dulcini® of Brazil.

The resulting composition was a homogeneous clear liquid at 25° C., suitable for transport and use as an extender for resin based glues.

Example 5

Glues and Plywoods

Two plywood glues were prepared, 5A and 5B. Glue 5A is a wood glue according to the invention whereas Glue 5B is not. Details of the two glues are given below:
Glue 5A (Invention)
57% phenolic resin solution (50% by weight phenol formaldehyde resin, 50% by weight water as detailed above)
14.33% extender composition of Example 4
14.33% Wheat Flour
14.33% Water
This gave as a resulting composition for 5A:

| Phenolic resin | 28.5% |
|---|---|
| Sodium silicate | 5.80% |
| Sugar | 1.09% |
| Wheat flour | 14.33% |
| Water + minors | to 100% |

Glue 5B (Comparative Example)
71.33% phenolic resin solution (50% by weight phenol formaldehyde resin, 50% by weight water as detailed above)
14.33% Wheat Flour
14.33% Water
This gave as a resulting composition for 5B:

| Phenolic resin | 35.65% |
|---|---|
| Wheat flour | 14.33% |
| Water + minors | to 100% |

Effectively, 5A is as for 5B but with 7.15% of phenolic resin in the composition replaced by sodium silicate 5.80% sodium silicate and 1.09% of sugar (with the amount of water taking up the difference).

Each glue was prepared by mixing together the ingredients for 3 to 5 minutes. The resin solution was added to the mixer first, followed by extender (if present) followed by a pre-mixed blend of water and wheat flour. Each glue had approximately the same viscosity of between 1.0 and 1.5 Pa.s at 25° C. and 21 sec$^{-1}$. The glues were used to used to prepare plywood as follows:

9 veneers of pine wood, each with mutually orthogonal grain directions, were glued together by applying a thin glue layer to a veneer, placing the next veneer on top, and repeating the process. A roller was used to apply the glue to each veneer. The total glue usage was 300 to 400g/m$^2$ of final plywood.

The resulting veneer sandwiches were then cold pressed (at ambient temperature of about 30° C. for 5 minutes at a pressure of 5 kgf/cm$^2$), followed by hot pressing, about 1 hour later, at 125-140° C. at a pressure of 12kgf/cm$^2$ for 12 minutes. For hot pressing, a heating sheet is placed between each sheet of plywood to be pressed so that the high temperature required to set the glue is achieved.

The resulting plywood sheets had a thickness of 18 mm for both glues.

The manufacture of the sheets complied with the Standard EN314-1: 1993. The test methodology of this standard was then used to compare the bonding quality of the plywoods produced using the two glues, 5A and 5B, by shear testing. Both the plywood panels produced using glue 5A and glue 5B met the bonding quality requirements as specified in EN314-2: 1993. This specifies a mean apparent cohesive wood failure of 80% or more if the shear strength is from 0.2 to 0.4 N/mm$^2$, a mean apparent cohesive wood failure of 60% or more if the shear strength is from 0.4 to 0.6 N/mm$^2$, a mean apparent cohesive wood failure of 40% or more if the shear strength is from 0.6 to 1.0 N/mm$^2$ and puts no requirement on cohesive wood failure if the mean shear strength is at least 1.0 N/mm$^2$.

Tests were carried out for pre-treatments corresponding to dry storage (20° C. at 65% RH) and to pre-treatment 5.1.3 of the standard (immersion for 4 hours in boiling water, drying in a ventilated drying oven at 60° C. for 20 hours, immersion for 4 hours in boiling water and then cooling in water at 20° C. for 1 hour).

Both sets of plywood passed the normative requirements of the Standard, showing that excellent plywood bonding strength, comparable to prior art plywood using conventional resin glue, could be achieved by a glue according to the invention, having a lower resin content than the conventional glue.

The invention claimed is:

1. A method for the preparation of a wood glue comprising from 4% to 60% by weight of a resin, the method comprising the steps of (i) providing an aqueous extender composition comprising from 20% to 50% by weight of alkali metal silicate and from 1% to 25% by weight of polyhydric alcohol, (ii) providing a solution comprising a resin and (iii) blending the aqueous extender composition of step (i) and the solution of step (ii) together to form the wood glue,
   wherein the polyhydric alcohol has a solubility of at least 30% by weight in water.

2. A method for the preparation of a wood glue comprising from 4% to 60% by weight of a resin, the method comprising the steps of (i) providing an aqueous extender composition comprising from 20% to 50% by weight of alkali metal silicate and from 1% to 25% by weight of a polyhydric alcohol comprising sugar, (ii) providing a solution comprising a resin and (iii) blending the aqueous extender composition of step (i) and the solution of step (ii) together to form the wood glue.

3. A method according to claim 2 wherein the polyhydric alcohol consists essentially of sucrose.

4. A method according to claim 3 wherein the alkali metal silicate has a molar ratio of alkali metal oxide to SiO$_2$ expressed as SiO$_2$/M$_2$O, where M represents the alkali metal, from 0.9 to 3.7.

5. A method according to claim 4 wherein the alkali metal silicate is sodium silicate, potassium silicate or a mixture thereof.

6. A method according to claim 3 wherein the resin is a condensation polymer resin, preferably a resin selected from the group consisting of urea formaldehyde, phenol formaldehyde, melamine formaldehyde and mixtures thereof, more preferably phenol formaldehyde.

7. A glue comprising from 4% to 60% by weight of resin and from 0.5% to 50% by weight of an aqueous extender, the extender comprising from 20% to 50% by weight of alkali metal silicate and from 1% to 25% by weight of polyhydric alcohol, wherein the alkali metal silicate is selected from the group consisting of sodium silicate, potassium silicate or a mixture thereof, wherein the alkali metal silicate has a molar ratio of alkali metal oxide to SiO$_2$ expressed as SiO$_2$/M$_2$O, where M represents the alkali metal, from 0.9 to 3.7, and wherein the polyhydric alcohol has a solubility of at least 30% by weight in water.

8. A glue comprising from 4% to 60% by weight of resin, from 0.1% to 25%, by weight of alkali metal silicate and from 0.05% to 12.5% by weight of polyhydric alcohol, wherein the polyhydric alcohol has a solubility of at least 30% by weight in water.

9. A glue according to claim 8 wherein the alkali metal silicate has a molar ratio of alkali metal oxide to $SiO_2$, expressed as $SiO_2/M_2O$, where M represents the alkali metal, from 0.9 to 3.7.

10. A glue according to claim 9 wherein the alkali metal silicate is sodium silicate, potassium silicate or a mixture thereof.

11. A glue comprising from 4% to 60% by weight of resin, from 0.1% to 25%, by weight of alkali metal silicate and from 0.05% to 12.5% by weight of a polyhydric alcohol comprising sugar, wherein the alkali metal silicate has a molar ratio of alkali metal oxide to $SiO_2$, expressed as $SiO_2/M_2O$, where M represents the alkali metal, from 0.9 to 3.7 and wherein the alkali metal silicate is sodium silicate, potassium silicate or a mixture thereof.

12. A glue according to claim 11 wherein the polyhydric alcohol consists essentially of sucrose.

13. A glue according to claim 12 wherein the resin is a condensation polymer resin, preferably a resin selected from the group consisting of urea formaldehyde, phenol formaldehyde, melamine formaldehyde and mixtures thereof, more preferably phenol formaldehyde.

14. A glue according to claim 13 comprising up to 25% by weight of solid particulate water-insoluble filler.

15. A method for preparing wooden composites comprising the steps of (i) providing a glue according to claim 13, (ii) providing particles or sheets of wood and (iii) gluing together the particles or sheets of wood with the glue.

* * * * *